United States Patent [19]

Cignetti et al.

[11] Patent Number: 4,836,273
[45] Date of Patent: Jun. 6, 1989

[54] MICRO MILL CONTINUOUS STEEL PROCESS

[75] Inventors: Nicolas P. Cignetti, Canton, Ohio; John H. Mortimer, Medford, N.J.; Richard U. Swaney, Tarentum, Pa.

[73] Assignee: Inductotherm Corp., Rancocas, N.J.

[21] Appl. No.: 258,068

[22] Filed: Oct. 13, 1988

Related U.S. Application Data

[63] Continuation-in-part of Ser. No. 928,768, Nov. 10, 1986, abandoned.

[51] Int. Cl.$^4$ .................... B22D 11/04; B22D 11/10; C21C 5/52
[52] U.S. Cl. .................................. 164/471; 75/10.15; 75/10.17; 164/477
[58] Field of Search ............... 164/471, 477; 75/10.15, 75/10.16, 10.17

[56] References Cited

U.S. PATENT DOCUMENTS

| | | | |
|---|---|---|---|
| 2,936,326 | 5/1960 | Tama | 164/471 X |
| 3,443,806 | 5/1969 | Galey et al. | 75/10.16 |
| 3,913,005 | 10/1975 | Cook | 321/68 |
| 3,948,643 | 4/1976 | Fredriksson et al. | 75/10.15 |
| 4,023,962 | 5/1977 | Nakagawa et al. | 164/471 X |
| 4,116,678 | 9/1978 | Lafont et al. | 75/10.16 |
| 4,120,696 | 10/1978 | Geck et al. | 75/10.15 |

FOREIGN PATENT DOCUMENTS

| | | |
|---|---|---|
| 527763 | 6/1931 | Fed. Rep. of Germany . |
| 2049278 | 7/1971 | Fed. Rep. of Germany . |
| 2406480 | 8/1974 | Fed. Rep. of Germany . |
| 3301427 | 7/1984 | Fed. Rep. of Germany . |

OTHER PUBLICATIONS

Hassig, M., "Horizontal Continuous Casting ... a Technology for the Future?" presented Sep. 1983 to the Association of Iron and Steel Engineers.
Sharpless, R. Q., "Efficient Batch Melting with Coreless Furnaces", *Foundry Management & Technology*, Feb. 1985.
Fruehan, R. J., "Ladle Refining Furnaces for the Steel Industry", *Center of Metals Production*, Mar. 1985.
Duncan, R., "Coreless Induction Melting in Steel Foundries", Castell Technical Service, Lopez, Washington.
Simpson, M. G.; "A New Application for Induction Melting Furnace in Micro Steel Plants", SEAISI Quarterly, Jul. 1984.

*Primary Examiner*—Nicholas P. Godici
*Assistant Examiner*—J. Reed Batten, Jr.
*Attorney, Agent, or Firm*—Seidel, Gonda, Lavorgna & Monaco

[57] ABSTRACT

A method of refining steel utilizing induction melting furnaces sized for use in micro mills consists of charging a medium frequency induction melting furnace having a maximum production rate of about 50 tons per hour with pre-refined steel, and melting steel in the furnace. The melted steel is transferred to a refining vessel, the refining vessel has a high free board, induction heating and stirring capacity and apparatus for supplying blasts of gas. The refined steel is then transferred to a tundish for a continuous casting operation.

2 Claims, 2 Drawing Sheets

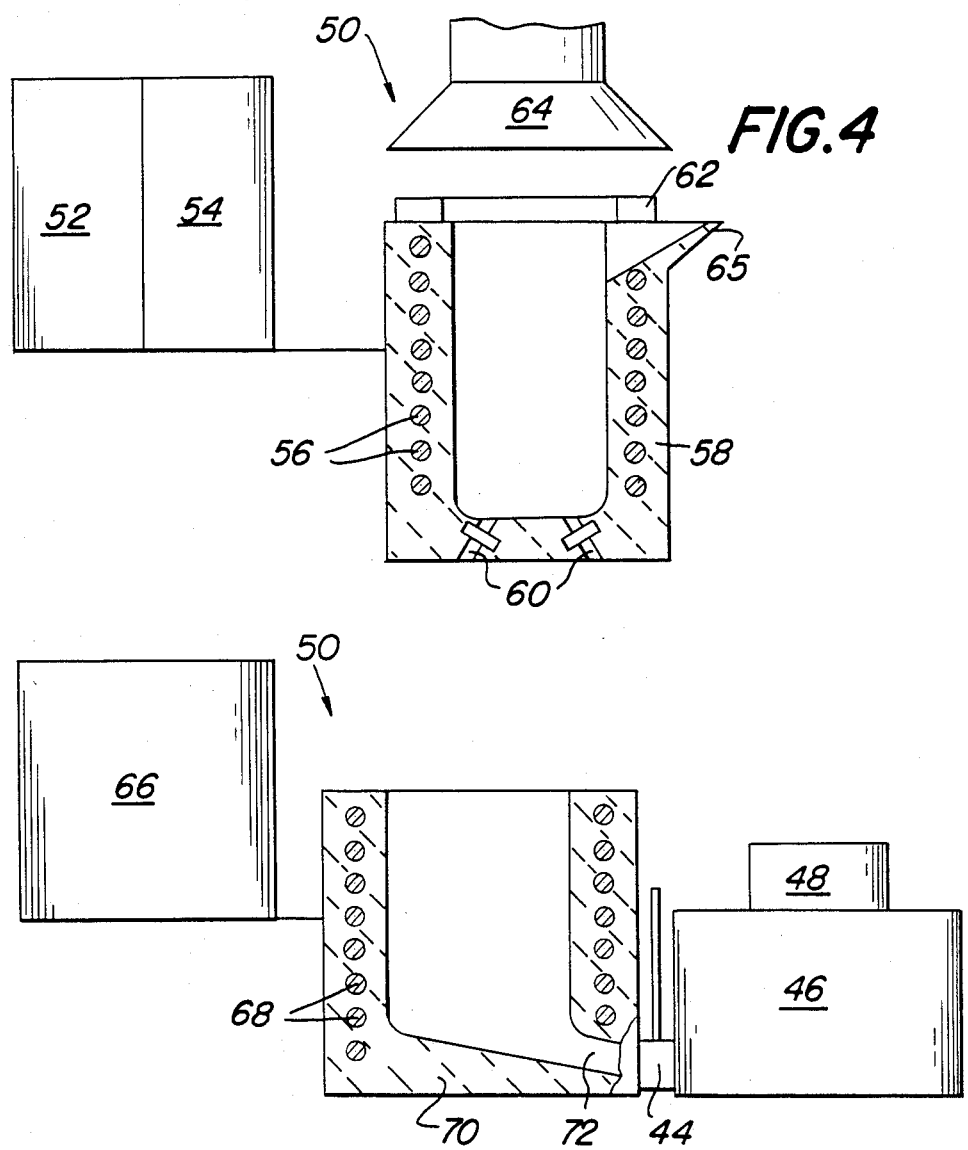

MICRO MILL CONTINUOUS STEEL PROCESS

This is a continuation-in-part of co-pending application Ser. No. 928,768 filed on Nov. 10, 1986 and now abandoned.

SCOPE OF THE INVENTION

The present invention is directed to a micro mill continuous steel process. The purpose of this invention is the economic recycling of pre-refined steel, such as but not limited to scrap steel.

BACKGROUND OF THE INVENTION

Presently, steel scrap is taken from major industrial areas, shipped to remote sites, melted in arc furnaces, either refined in the arc furnace or a ladle metallurgy station and then direct cast into ingots, billets or slabs. The ingot, billets or slabs are then shaped into various end products by conventional rolling or casting means. Additionally, work is being done to develop casters which will continuously cast such end products as rods, wires, sheets and slabs.

Heretofore, the steel industry has used ladle "arc" refining technology as a method for optimizing and increasing the flexibility of the steel production process. The state of ladle "arc" refining furnace technology is set forth in an article by R. J. Fruehan, Professor and Director of CISR, Carnegie-Mellon University, entitled "Ladle Refining Furnaces for the Steel Industry", a report prepared for the *Center of Metals Production*, in March 1985. In the article, ladle furnaces are described as "not unlike electric arc furnaces", *Supra*, page 2. Furthermore, the report notes that ladle "arc" furnaces typically range in size from 30–60 tons (a small unit) to 180–240 tons (a large unit). *Supra*, page 2. The report also notes that it is known to use induction stirring techniques in such ladle "arc" refining furnaces. *Supra*, Table 4.1.

Induction melting furnaces have been used by the steel foundry industry for approximately 20 years. For example, see the article by R. Duncan entitled "Coreless Induction Melting in Steel Foundries" written for Castell Technical Service of Lopez, Wash. But their application has been limited because at production rates of 100 tons per hour or higher, the furnaces have not proven successful because of their use of 60 cycle current induction technology.

Conventional steel making practice relies on the oxygen decarburization reaction to accomplish refining of the steel scrap or reduce iron used as the charge materials in the melt operation. The decarburization process is characterized by the addition of sufficient carbon during melt or subsequent to melting and then removing the carbon by use of either solid oxygen in the form of scale or ore, or by gaseous injection through lances or other means to achieve a rapid and violent boil. The benefits of carbon are first to lower the melting point of the solid mass thereby reducing the energy to form a molten pool, and second to refine by the generation of carbon monoxide which bubbles through the liquid steel causing the boil. Because most melting processes are relatively slow and usually carried out in air, such as electric arc melting, line frequency or 60 cycle coreless induction, oxidation of the raw materials in the furnace before they turn into liquid is quite prevalent and is another reason for the requirement of the carbon oxygen decarburization reaction.

Another reason for the need of a carbon boil is the increase in the quantities of hydrogen and nitrogen to the liquid steel caused by atmospheric conditions during a slow melting or the action of the electric arc and electric arc melting which ionizes these gases that are then absorbed by the melt. The decarburization reaction flushes excesses of these gases from the melt to tolerable levels.

The action of the arc in the electric arc melting of steel, the slowness and unfavorable melting characteristics of line or 60 cycle frequency coreless induction furnces, and the lack of sufficient power capabilities of the early and non-solid state medium frequency coreless induction furnces made it necessary to rely on the carbon oxygen reaction to form gas bubbles for refining steel prior to the instant invention.

Prior to the instant invention, steel production at micro mill rates, disclosed hereinafter, were either not capable of being produced economically or else required processing methods such as the carburization/decarburization action in order to be economically viable.

SUMMARY OF THE INVENTION

The present invention is directed to a method for refining steel utilizing induction melting furnaces sized for use in micro mills. The method includes the steps of:

(a) charging a medium frequency induction melting furnace having a maximum production rate of about 50 tons per hour with pre-refined steel and melting the steel in the furnace;

(b) transferring the melted steel to a refining vessel, the refining vessel comprising a vessel having a high freeboard, means for induction heating and stirring, and means for supplying blasts of a gas; and (c) transferring the refined material to a tundish for a continuous casting operation.

Alternately, the method could include the steps of:

(a) charging a medium frequency induction melting/stirring furnace having a maximum production rate of about 50 tons per hour with pre-refined steel and melting and stirring the steel in said furnace. The furnace comprises a vessel having a high freeboard, means for induction heating and stirring, and means for supplying blasts of a gas; and (b) transferring the refined material to a tundish for a continuous casting operation.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 4 and 5 when viewed in series illustrate a schematic representation of the equipment utilized in performing the alternate method of the present invention.

DETAILED DESCRIPTION OF THE INVENTION

Figure 1:
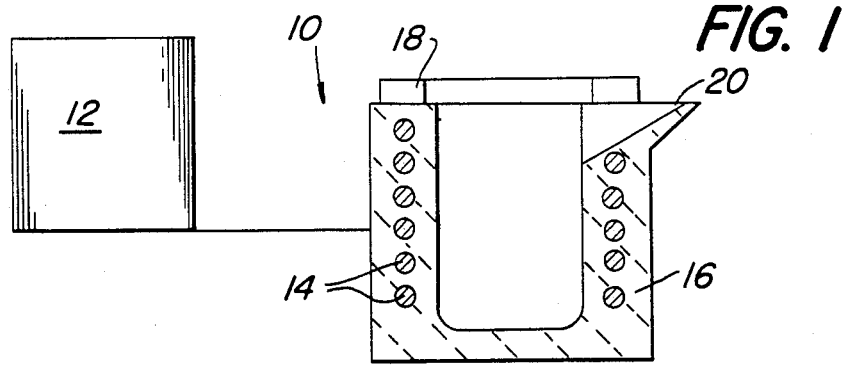
FIGS. 1–3 when viewed in series illustrate a schematic representation of the equipment utilized in performing the method of the present invention.
Figure 2:
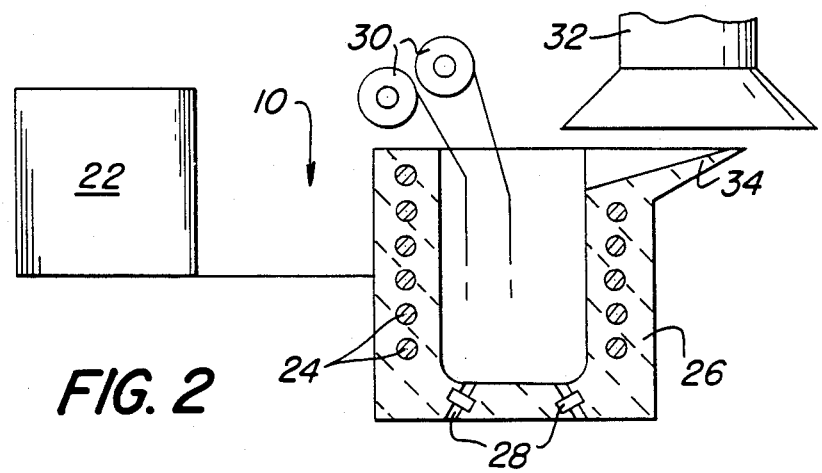
Figure 3:
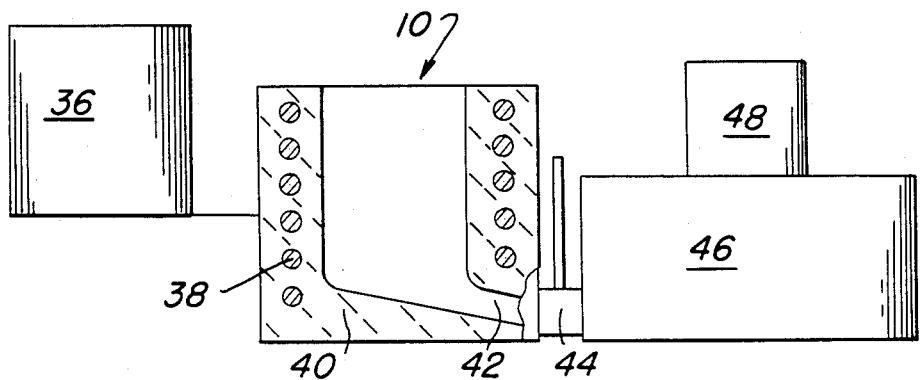

Referring to the drawings, wherein like numerals indicate like elements, there is shown in FIGS. 1–3 a first embodiment 10 of the method for refining steel utilizing induction melting furnaces sized for use in micro mills having a maximum production rate of up to about 50 tons per hour. Micro mills are usually regardeed as mills which can continuously process steel at production rates from about 5,000 to about 250,000 tons per year and preferably between greater than 30,000 tons per year and about 250,000 tons per year.

The term "pre-refined" steel is used herein to mean primarily "scrap" steel, but any steel could be used.

A solid state medium frequency induction power supply 12 is operatively connected to the induction coils 14 in a basic melting furnace 16. The term "medium frequency", as used herein and as is well known to those of ordinary skill, generally means a single phase alternating current of from about 180 cycles per second to about 1200 cycles per second and can be any range within that broad range such as from about 180 cycles per second to less than 500 cycles per second. In contrast, "low frequency" generally refers to those frquencies less than 180 cycles per second and "high frequency" generally refers to those frequencies greater than 1200 cycles per second. Each of these terms are well known in the art. It is the rapid melting capacities of the medium frequency coreless induction furnace that make it economically feasible and technologically possible to produce high quality steel at production rates up to 50 tons per hour; The induction power supply 12 is well known in the art. For example see R. Q. Sharpless, "Efficient Batch melting with Coreless Furnaces" *Foundry Management & Technology*, February, 1985. Induction coils 14 and furnace 16 are well known to those skilled in the art. Furnace 16 includes a fume ring 18 disposed on the upper surface of the furnace 16 and a spout 20. Pre-refined steel is charged into furnace 16 cold. The steel is then melted within the basic melting furnace 16. After complete melting of the pre-refined steel, it is transferred via spout 20 to a refining vessel 26.

An induction power supply 22 for stirring and superheating is operatively connected to the induction coils 24 of the refining vessel 26. The power supply 22 is disclosed in U.S. Pat. No. 3,913,005 which is incorporated herein by reference. The stirring function is to ensure proper grain size and metallurgical characteristics. Induction coils 24 and vessel 26 are well known in the art. Refining vessel 26 may include means for introducing blasts of a gas 28, a spout 34, a degassing hood 32 and means for adding alloys and refining elements 30. Vessel 26 also has a high freeboard to allow for turbulence. Refining of the metal is performed in vessel 26.

The means for introducing blasts of a gas 28 include porous plugs or tuyeres, both of which are well-known to those skilled in the art. The means for introducing blast of a gas 28 are located in the lower portion of the vessel 26. The gas could be air, argon, nitrogen, carbon dioxide, etc. The means for introducing blasts of a gas, while it may have utility in the instant invention, is not necessary and can be excluded from the claimed process described herein.

Means for adding alloys and refining elements 30 are disclosed as a plurality of wire feed systems. Although this system is preferred, those skilled in the art realize that other such systems are available.

Refining in the solid-state medium frequency coreless furnace differs from conventional steel making practices, discussed above. Those differences include, but are not limited to, the elimination of the necessity of any oxygen via lances or otherwise, and the elimination of the necessity to add carbon to the melt and then decarburizing the melt, typically done by oxidation. The use of medium frequency coreless induction furances eliminates these steps because it rapidly melts the charge in a relatively tall and narrow vessel which limits the surface exposure of the melt to the ambient atmosphere and thereby prevents the melt from absorbing contaminants from the atmosphere.

The degassing hood 32 is conventional and well-known to those skilled in the art.

After the refining operation is complete, molten metal from the refining vessel 26 is transferred via spout 34 to tundish 40.

An induction power supply for stirring and superheating 36 (see U.S. Pat. No. 3,913,005) is connected to induction coils 38 of tundish 40 in a conventional manner. Coils 38 and tundish 40 are well known in the art. Tundish 40 includes a discharge port 42 which is located in the lower portion of tundish 40. Discharge port 42 is operatively connected to a ceramic gate valve 44. Ceramic gate valve 44 is provided for controlling the flow of molten metal from tundish 40. Valve 44 is well known in the art.

Ceramic gate valve 44 is operatively connected to a horizontal caster 46 with in-mold and post-mold induction stirring capability. Such horizontal casters are well known to those skilled in the art. For example, see M. Haissig of Steel Casting Engineering, Ltd., Orange, Calif., article entitled "Horizontal Continuous Casting . . . a technology for the future! . . . " presented September, 1983 to the Association of Iron and Steel Engineers. An induction power supply 48 for in-mold and post-mold stirring and superheating is operatively connected to the horizontal caster 46 in a conventional manner. Although the horizontal caster is preferred, those skilled in the art will understand that any further processing step of steel could be performed at this step.

Referring to FIGS. 4 and 5, there is shown a second embodiment 50 of the method for refining steel utilizing an induction melting furnace sized for use in a micro mill having a maximum production rate of about 50 tons per hour.

An induction stirring power supply 52 and medium frequency induction power supply 64 are operatively connected to coils 56 of a combined melting and refining furnace 58 having high freeboard. Power supplies 52 and 54 are disclosed in U.S. Pat. No. 3,913,005. Furnace 58 may include a fume ring 62 located along the upper surface of furance 58, means for introducing blasts of a gas 60, a degassing hood 64 and a spout 65. Pre-refined metal is charged into furnace 58 and melted and stirred. Optionally, alloy and refining elements can be charged into the furnace 58. The degassing hood 64 is disposed over the upper open end of furnace 58 and used in a conventional manner.

Means for introducing blasts of a gas 60 are the same as those described with regard to embodiment 10 set forth above. After metal has been refined in furnace 58, it is transferred to tundish 70.

Induction power supply 66 is operatively connected to coil 68 of tundish 70. Tundish 70 includes a discharge port 72 located in the lower portion thereof. A ceramic gate valve 44 is connected to the discharge port in a conventional manner. Horizontal caster 46 is preferably operatively connected to gate valve 44.

The present invention may be embodied in other specific forms without departing from the spirit or essential attributes thereof and, accordingly, reference should be made to the appended claims, rather than to the foregoing specification, as indicating the scope of the invention.

We claim:

1. A method consisting essentially of the steps: continuously refining steel utilizing induction melting furnaces sized for use in micro mills, said refining excluding addition of carbon and decarburization, by
   (a) charging a first medium frequency coreless induction melting furnace having a production rate up to 50 tons per hour with pre-refined steel and melting the steel in said first furnace;
   (b) transferring the melted steel to and refining the steel in a second medium frequency coreless induction melting and stirring furnace having a production rate up to 50 tons per hour; and
   (c) transferring the refined steel to a tundish for a continuous casting operation.

2. A method consisting essentially of the steps: continuously refining steel utilizing an induction melting furnace sized for use in a micro mill, said refining excluding the addition of carbon and decarburization, by
   (a) charging a medium frequency coreless induction melting/stirring furnace having a production rate up to 50 tons per hour with pre-refined steel;
   (b) melting, refining and stirring the steel in said furnace; and
   (c) transferring the refined steel to a tundish for a continuous casting operation.

* * * * *